Feb. 19, 1952     E. A. MILLER     2,586,549
COIN-ACTUATED TIME-CONTROL MECHANISM
Filed July 17, 1948     3 Sheets—Sheet 1
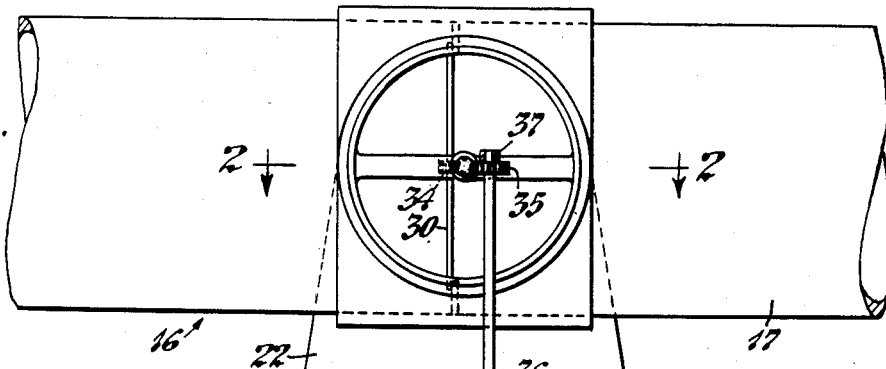
Fig.1.
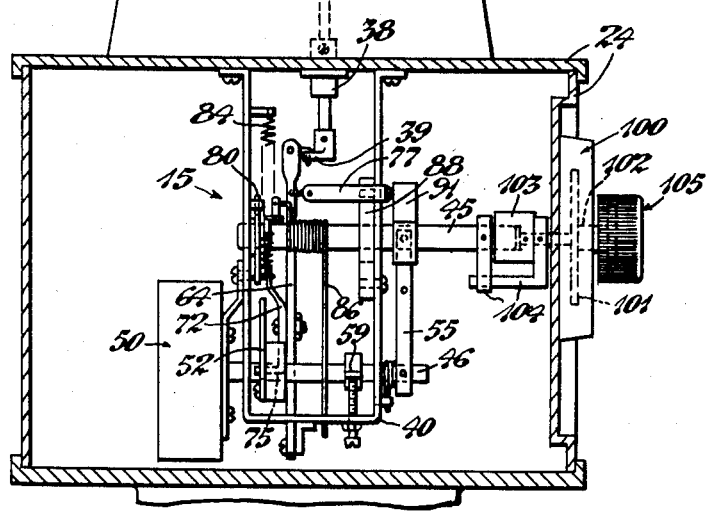
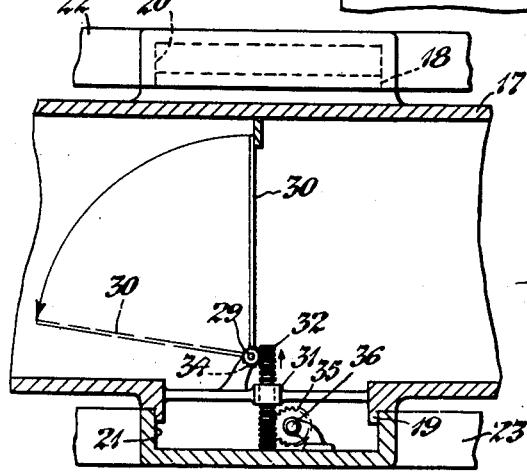
Fig.2.
INVENTOR:
Ernest A. Miller
BY
William C. Hall
ATTORNEY

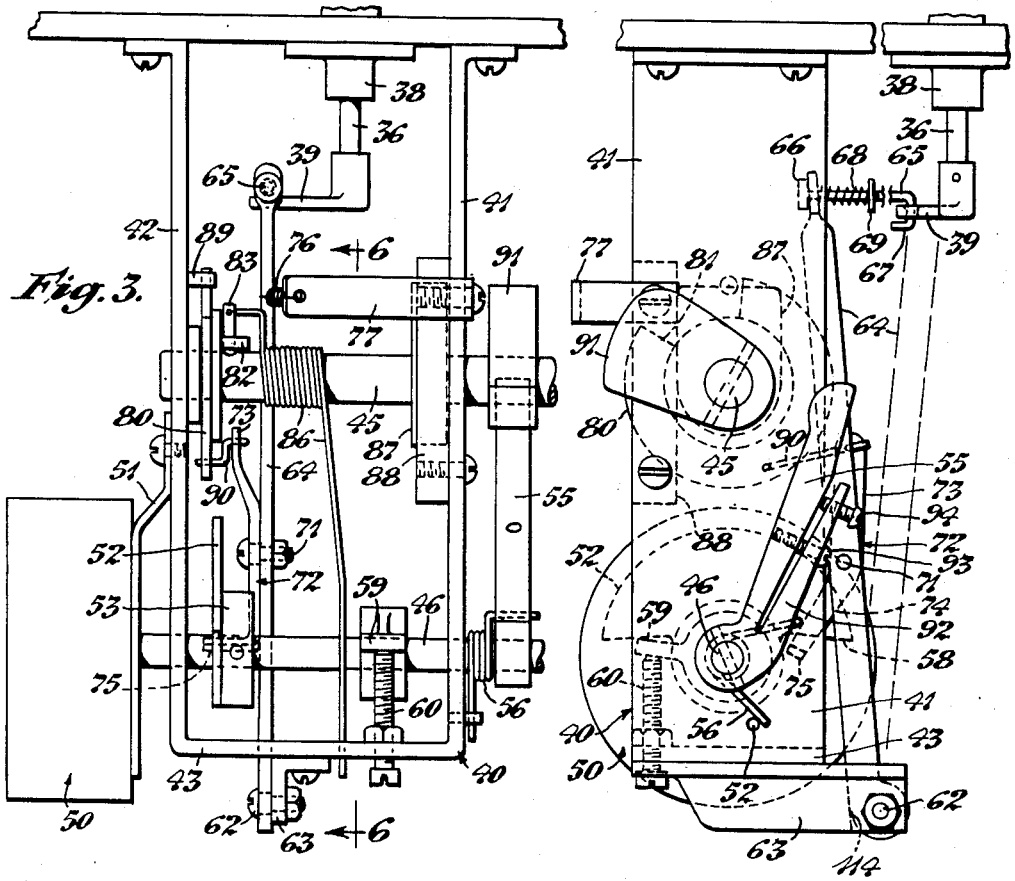

Feb. 19, 1952

E. A. MILLER 2,586,549

COIN-ACTUATED TIME-CONTROL MECHANISM

Filed July 17, 1948

INVENTOR.
Ernest A. Miller
BY
William B. Hall
ATTORNEY.

Patented Feb. 19, 1952

2,586,549

UNITED STATES PATENT OFFICE 2,586,549

COIN-ACTUATED TIME-CONTROL MECHANISM

Ernest A. Miller, Long Beach, Calif.

Application July 17, 1948, Serial No. 39,251

11 Claims. (Cl. 161—26)

This invention relates to telescopes, and particularly to a telescope of the coin-controlled type having a shutter movable therein and normally disposed in a position to close the telescope to prevent observation therethrough, but adapted to be moved to another position to open the telescope in response to actuation of a coin-controlled device. Specifically, the present invention pertains to a telescope, of the character referred to above, in which is embodied a time-control mechanism for controlling the duration of opening of the shutter so as to effect automatic closing of the shutter after a predetermined time interval.

Coin-actuated, time-controlled telescopes of the type discussed above are used quite extensively for permitting persons to view points of interest from vantage points, a person wishing to use the telescope first depositing a coin in the coin-control mechanism to open the shutter and then sighting the objective by pivoting the telescope in both horizontal and vertical directions. Upon actuation of the coin mechanism the time-control means is set in operation, and, after a predetermined time interval, the time-control mechanism functions to return the shutter to closed position so as to prevent further observation through the telescope until another coin is subsequently deposited. While such prior telescopes operate quite satisfactorily, they have certain common disadvantages. For example, the shutter-operating mechanism is not positive in operation, and is easily damaged by unscruplous persons attempting to open the shutter by exerting considerable force on the operating handle, or knob. Moreover, when the shutter-operating mechanism is damaged, it is extremely difficult to repair due to its peculiar construction and arrangement in the base of the telescope. Such prior shutter-operating mechanisms commonly employ chains, or other flexible connecting means, between the time-control and the shutter, and such means have the disadvantage of stretching, twisting, and breaking readily when subjected to abnormal exterior forces. For these reasons, such prior time-controlled telescopes require considerable servicing and frequent replacement of parts, and consequently the profit derived is substantially reduced.

It is a primary object of this invention to obviate the faults and difficulties of prior time-controlled telescopes outlined above by providing a telescope which is practically tamper-proof and one which can be readily serviced.

Another object is to provide a telescope of the character referred to which employs a pivoted shutter and includes a gear and rack drive for pivoting the same, the drive being so constructed that the shutter is actuated in response to a very slight movement of the time-control mechanism.

Another object is to provide a telescope of the type indicated employing a novel type of time-controlled shutter-actuating mechanism in which the mechanism is set in motion to perform a time-controlled cycle of operation of the shutter, by movement of a manually-operated knob and shaft in one direction, and the shutter opened in response to reverse rotation of the shaft to first position and at the completion of the coin-control cycle, that is, as the deposited coin is ejected into the usual coin box, so that it is impossible for a person to maintain the shutter open for a period of time in excess of the time permitted by the time-control device. This constitutes an important improvement over prior telescope operating mechanisms in which the shutter is opened during the first or forward movement of the manually rotatable shaft and in which the shaft can be retained in shutter-opening position to permit continuous observation through the telescope by the insertion of a single coin.

Another object is to provide a telescope of the type specified in which the time-controlled shutter-actuating mechanism is of rugged, durable construction, and possesses adequate stop means for limiting the return movement of the manually operable shaft so that, even when the shaft is released and permitted to return rapidly to first position under the force of a spring, the parts are not subjected to undue shock. A related object is to provide a time-control mechanism in which the timer device is set for a cycle of operation during the first or forward movement of the manually operable shaft so that such sudden return movement of the shaft will have no effect upon the timer device. This object is attained by providing a cam on the manually operable shaft which functions to set the timer device during the forward movement of the shaft and which is wholly disconnected from the timer device during the return motion of the shaft.

Another object is to provide a coin-actuated time-controlled mechanism for the purpose specified which has an improved operating knob which frictionally engages the operating shaft, this construction permitting relative rotation therebetween so as to avoid twisting and breakage of the shaft by forcing the knob beyond its intended range of movement.

Another object is to provide a time-control mechanism having means for minutely adjusting the timer device so that the duration of opening of the telescope shutter can be accurately controlled.

Another object is to provide a telescope shutter-actuating mechanism which is relatively simple in construction, durable in use, easily serviced, and one which is highly efficient in operation.

Further objects of the invention are set forth in the following specification which describes a preferred embodiment of the device, by way of example, as illustrated by the accompanying drawings. In the drawings:

Fig. 1 is a fragmentary side elevational view of a telescope equipped with a shutter which is actuated by the present improved time-control mechanism;

Fig. 2 is a sectional plan view of the telescope, taken on line 2—2 of Fig. 1;

Fig. 3 is an enlarged side elevational view of the time-control mechanism;

Fig. 4 is a front elevation of the same;

Fig. 5 is a fragmentary front elevational view of the mechanism, showing the time-control setting means;

Figure 6:
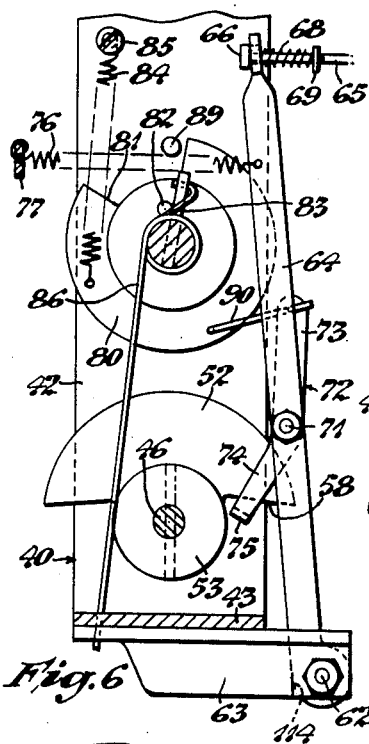
Fig. 6 is a vertical sectional view, taken on line 6—6 of Fig. 3.
Figure 7:
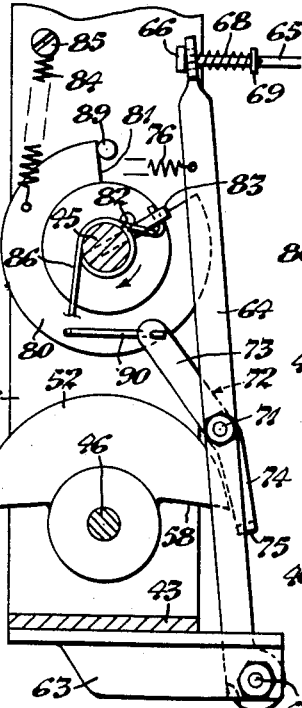
Figure 8:
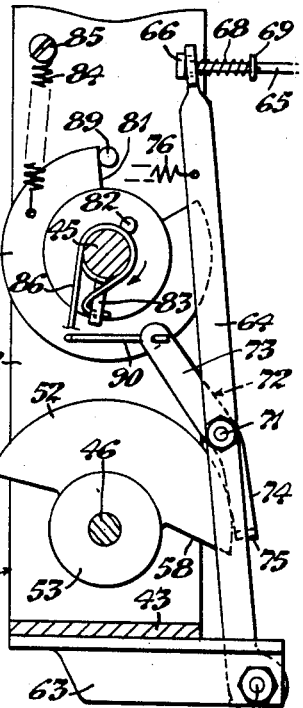
Figure 9:
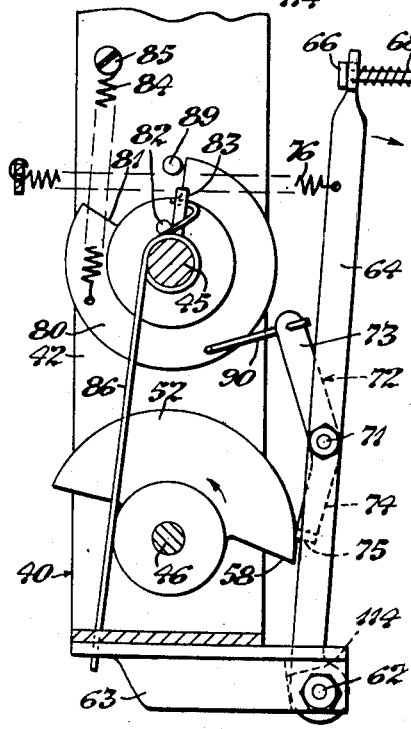
Figure 10:
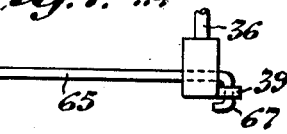

Figs. 7, 8, and 9, are views similar to Fig. 6, but showing the relationship of the various parts during successive steps in the complete cycle of operation; and, Fig. 10 is a longitudinal sectional view through the operating knob.

Referring to the drawings in detail, the present improved time-control mechanism 15 is herein shown as embodied in a telescope 16, which includes a telescope tube 17 having the usual system of lenses (not shown). The tube 17 has integral transverse trunnions 18 and 19 (Fig. 2) which are rotatable in bearings 20 and 21, respectively, formed at the upper ends of support members 22 and 23 which project upwardly from a box-like housing 24. The housing 24 is rotatable on the base (not shown) of the telescope so that the telescope tube 17 can be rotated on a vertical axis, in addition to pivoting on a horizontal axis, so as to align the tube with selected objectives, this construction being common to telescopes of the coin-operated types now in use.

Carried by a vertical pivot pin 29 within the telescope tube 17 is a shutter 30 which is adapted to be pivoted to the open position, indicated by the broken line in Fig. 2, to the closed position, shown by full lines therein, so as to extend across the interior of the telescope tube to prevent observation through the telescope, the shutter being adapted to be swung to open position only after a coin of proper denomination has been inserted into the coin control, to be later described. Slidable in a bearing 31 within the tube 17 is a gear rack 32, which is cylindrical and disposed with its axis in alignment with the horizontal pivotal axis of the tube, the rack having its rack teeth extending around its periphery. The pivot pin 29 carries a small gear 34 which meshes with the teeth of the rack 32. A larger gear 35 carried by a vertical shaft 36 also meshes with the rack 32 at the opposite side from the gear 34. The shaft 36 is rotatable in upper and lower bearings 37 and 38, the lower end of the shaft terminating within the housing 24 and carrying an arm 39 at this end. It will be apparent from the above that when the shaft 36 is rotated in opposite directions, this rotation is transmitted to the pivot pin 29 through the medium of the gear 35, rack 32, and gear 34 to pivot the shutter to open and closed positions. Since the gear 35 is substantially larger than the gear 34, the rotary motion of the gear 35 is multiplied so that only a small part of a revolution of the shaft 36 imparts the motion necessary to pivot the shutter 30. The time-control mechanism, which functions to rotate the shaft 36 through a partial revolution to open and close the shutter 30, is constructed as next described.

A V-shaped frame 40 has a forward leg 41 and a rearward leg 42, which are secured to the under side of the top wall of the housing 24, and a horizontal bottom portion 43. Rotatable in holes in the legs 41 and 42 is an upper horizontal control shaft 45 and a lower horizontal timing shaft 46. The rearward end of the shaft 46 is operatively connected to a timer device 50, which may be of any suitable conventional type now employed for similar purposes, and therefore not disclosed in detail herein. The timer device 50 may be supported by a bracket 51, shown in Fig. 3. Fast on the timing shaft 46 is a timing cam 52, which is in the form of a substantially semicircular disc carried by a hub 53. At its forward projecting end, the shaft 46 has an arm 55 which is provided with a rounded upper end. A spring 56, coiled around the shaft and having one end engaging the arm 55 and its other end disposed against a pin 57, tends to rotate the timing shaft in counterclockwise direction, as viewed in Figs. 4 to 9. Such rotation of the shaft 46 and its cam 52, under the influence of the spring 56, is controlled by the escapement mechanism of the timer device 50, however, so that the rotation of these parts is relatively slow. The cam 52 has a radial surface 58 which, when moved from the position shown in Fig. 9 to that illustrated in Fig. 6, permits closing of the telescope shutter 30. Movement of the cam 52 in this direction may be limited by the engagement of a finger 59 on the shaft 46 with an adjustable stop screw 60, see Figs. 3, 4, and 5.

Pivoted on a horizontal stud 62, carried by a bracket 63 mounted on the bottom portion 43 of the frame 40, is a substantially vertical actuating lever 64, the upper end of which is operatively connected to the arm 39 of the vertical shaft 36 by means of a wire link 65 having a head 66 abutting the side of the lever and a hook 67 at its other end engageable in a hole in the arm 39. A spring 68 surrounding the link 65 between the lever 64 and a collar 69 on the link is employed as a means for absorbing shock if and when the lever 64 is pivoted rapidly toward the right, as viewed in Fig. 9.

Pivotally mounted on a pivot-stud 71, carried by the actuating lever 64, is a bell crank lever 72 having an upper arm 73 and a lower arm 74 provided with a bent ear which provides a cam follower 75 adapted to engage against the periphery of the timing cam 52. The cam follower 75 is held against the edge of the timing cam 52, by means to be later described, during movement of the cam 52 from the position illustrated in Fig. 9 to that shown in Fig. 6. During this interval, the telescope shutter 17 is open to permit observation therethrough. When the cam 52 arrives at the position shown in Fig. 6, a spring 76 connected between the actuating lever 64 and an angular bracket 77 secured to the leg 41 acts to swing the actuating lever toward the left, as shown in Fig. 6, and this action causes the shaft 36 to be rotated in a direction to pivot the shutter 17 to closed position.

Rotatably mounted on the control shaft 45 is a stop disc 80 which has a radial stop shoulder 81 thereon. The disc 80 is located adjacent the leg 42 of the frame 40, and has a forwardly projecting pin 82 which is normally held against a pin 83 projecting radially from the control shaft 45, by means of a spring 84 connected between the disc and a screw 85 and tending to rotate the disc in clockwise direction, as viewed in Fig. 7. Such rotative movement of the disc 80 is, however, normally prevented, due to the action of a spring 86 of stronger tension than the spring 84. The spring 86 is coiled around the shaft 45, and has one end hooked through a hole in the pin 83 and its other end engaged in a hole in the lower portion 43 of the frame 40. It is thus seen that the spring 86 tends to rotate the shaft 45 in counterclockwise direction with its pin 83 acting to also rotate the disc 80 in the same direction. Rotation of the control shaft 45 in this direction is limited by the engagement of one side of a stop finger 87 on the shaft with the side of an abutment strip 88 fixed to the inner surface of the leg 41.

When the shaft 45 is manually rotated in clockwise direction, the stop disc 80 also rotates through a partial rotation in the same direction, due to the action of the spring 84. However, due to the engagement of the stop shoulder 81 of the disc with a stop pin 89 on the leg 42, the rotation of the disc in this direction is limited to only a part of the complete rotation of the shaft 45. Connected between the disc 80 and the upper end of the arm 73 of the bell-crank lever 72 is a wire link 90 which, when the disc is rotated in clockwise direction, exerts a pull on the arm 73 to pivot the bell-crank lever in counterclockwise direction so as to withdraw the cam follower 75 radially outward away from the periphery of the timing cam 52.

Further rotation of the shaft 45 in clockwise direction causes a cam 91 thereon to engage the upper rounded end of the arm 55, carried by the timing shaft 46, and to pivot the arm from the position shown in Fig. 4 to that illustrated in Fig. 5. Such pivotal movement of the arm 55 causes clockwise rotation of the timing shaft 46 to "set" position, that is, to a predetermined position where a portion of the periphery of the cam 52 is disposed opposite the cam follower 75, as determined by the throw of the cam 91. That is to say, it is desirable that the shutter 17 remain open for a predetermined, constant period of time and for this reason the timing cam 52 is fixed, instead of being adjustable on its shaft 46. However, in order to insure that the shutter 17 will remain open for the exact predetermined time interval, the setting arm 55 is made adjustable circumferentially of the shaft 46. Referring to Figs. 4 and 5, it will be seen that the arm 55 is slit longitudinally, thereby causing the arm to possess resiliency and providing a finger 92. A screw 93 passing through a hole in the finger 92 and screwed into a threaded hole in the arm 55 can be rotated to move the arm toward and away from the finger, in other words circumferentially of the shaft 46 so as to effect minute setting of the timing cam 52. A second screw 94 screwed through a threaded hole in the finger 92 engages the side of the arm 55 to lock the latter in its adjusted position.

It has been stated that the control shaft 45 and its associated parts is operated manually, and this is accomplished by means to be next described. Referring to Fig. 1, a coin-control mechanism 100 is mounted on the front wall of the housing 24, this mechanism being of conventional form and therefore not herein disclosed in detail. Suffice it to state that the coin-control mechanism is of the ratchet and pawl type and includes a coin plate 101 into which a coin of correct denomination can be inserted, and which is carried by a short shaft 102 having a socket 103 at its inner end for receiving the outer end of the control shaft 45. Lever means 104 are employed for connecting the shafts 102 and 45 for unitary rotation. By inserting a coin the shaft 102 can be rotated, by means of a knob 105 on the outer end of the shaft, and after the shaft 102 is rotated through a half revolution, the coin is ejected. At this juncture, the stop finger 87 strikes the abutment strip 88 to prevent further rotation in this direction. As a further means for guarding against damage to the coin mechanism, the knob 105 is constructed as next explained.

Referring to Fig. 10, the shaft 102 is provided with a head 106 at its outer end. Slid onto the shaft 102 and disposed against the inner side of the head 106 is an externally threaded annulus 107, and screwed onto this annulus is the open end of a cup-shaped knob 105 which may be knurled on its exterior if desired. Disposed within the knob 105 is a disc 109 which is urged against the head 106 by means of a friction disc 110 having inclined resilient tabs 111. Arranged between the head 106 and the annulus 107, and between the head and the disc 109, are friction pads 112 and 113. It is thus seen that when the knob 105 is rotated and a coin is in the plate 101 the shafts 102 and 45 are likewise rotated, but if forcible rotation of the shafts is attempted by forcing the knob 105 the latter will merely slip with respect to the head 106, so as to guard against such unwarranted manipulation which would cause damage to the ratchet means within the coin mechanism.

Assuming that the various parts of the telescope-control mechanism are in the relative positions, shown in Figs. 1 to 4 and 6, the telescope is conditioned for use for a limited predetermined period of time in the following manner: As will be understood, the shutter 17 normally assumes the position shown in Fig. 1, that is, across the inside of the telescope, so that observation therethrough is impossible. To render the telescope operative, a coin is first deposited in the coin mechanism and the knob 105 then rotated in clockwise direction. The coin, acting as a key, permits rotation of the shaft 102 and the control shaft 45 connected thereto. As the control shaft 45 is thus rotated, the disc 80 is turned by reason of the pin 82 following the pin 83 under the action of the spring 84. The disc 80 acts, through the link 90, to pivot the bell-crank lever 72 from the position shown in Fig. 6 to that illustrated in Fig. 7, so as to move its follower ear 75 outwardly away from the timing cam 52. During this movement, the actuating lever 64 is retained in the position shown in Figs. 6 and 7 with its lower end resting against an inclined shoulder 114 of the bracket 63 under the tension of the spring 76.

Upon reaching the position shown in Fig. 7, the shoulder 81 of the disc 80 strikes the pin 89 to prevent further rotation of the disc. Consequently, as the shaft 45 is rotated further in this direction the follower 75 remains outside the path of movement of the timing cam 52, and the setting cam 91 engages the arm 55, as shown in Fig.

5, to turn the shaft 46 and cam 52 in clockwise direction and also to set the clock or timer device 50, as shown in Fig. 8. Eventually, after the control shaft 45 has been rotated through a complete half revolution against the action of the spring 86, the stop finger 87 strikes the abutment strip 88 to positively prevent further rotation in this direction. It is to be particularly noted that the actuating lever 64 remains at rest during this half revolution of the shaft 45 so that the shutter 17 remains closed, and that it is necessary to turn the shaft sufficiently to set the timing elements before the shutter can be opened, so that discharge of the coin into the coin box or receptacle is therefore essential.

After the timing cam 52 has been set in the manner explained above, the shaft 45 is permitted to return to first position under the action of the spring 86. During the first portion of this rotation the setting cam 91 moves away from the arm 55 to permit the timing cam 52 to start rotating in counterclockwise direction at a relatively slow rate of speed as controlled by the timer device 50. Eventually, the pin 83 of the control shaft 45 engages the pin 82 of the disc 80, as shown in Fig. 7, and continued rotation thus causes the disc to rotate in counterclockwise direction, against the action of its spring 84 until the disc assumes the position shown in Fig. 9. During this latter rotation of the disc 80, the link 90 acts against the bell-crank lever 72 to pivot the latter in clockwise direction so as to engage the follower 75 against the periphery of the timing cam 52. Continued pivotal movement of the bell-crank lever 72 in this direction acts with a prying action, with the follower acting as a fulcrum, to pivot the actuating lever 64 toward the right, as shown in Fig. 9. The lever 64, acting through the link 65, arm 39, shaft 36, gear 35, rack 32, and gear 34, causes the shutter 30 to swing to the open position, indicated by broken lines in Fig. 2, so as to permit use of the telescope for a predetermined length of time. At this time, the timing cam 52 is rotating very slowly, and if an attempt is made, during the period that the shutter is open, to turn the control shaft 45 so as to reset the cam 52 to initial position, thereby to obtain service of the telescope for a greater period of time, without first depositing another coin, such resetting is impossible. If an attempt is made to force the knob 105 in either direction, the friction means within the knob will yield to prevent breakage of the parts of the coin mechanism 100.

During use of the telescope in sighting various objectives, the cam 52 continues to rotate at a slow rate, and eventually its radial face 58 aligns with the follower 75. At this point, the spring 76 acts to pivot the actuating lever 64 and its bell-crank lever 72 to the position, shown in Figs. 4 and 6, whereby to restore the parts to inoperative position. During this return movement of the lever 64, the shutter 17 is pivoted to the closed position, shown by full lines in Fig. 1, so as to shut off the view through the telescope. The timer device 50 may continue to rotate the cam 52, but eventually the stop finger 59 engages the stop screw 60 to arrest the operation of the device. With the mechanism thus returned to inoperative position, the cycle of operation can be repeated by first depositing a coin and manipulating the control shaft 45 to reset the mechanism for another time-controlled operation.

I claim as my invention:

1. A time-controlled mechanism for moving an element to two positions and for controlling the duration of stay of the element at the first of said positions, comprising: rotatable cam means; rotatable operating means; manually operable means for rotating said operating means in opposite directions; means rotatable with said operating means for rotating said cam means in one direction to a set position; a timer device for rotating said cam means in the opposite direction to a release position; an actuating lever operatively connected to said element for moving the same to said two positions; cam follower means movable on said actuating lever and operatively connected to said manually rotatable operating means and engageable with said cam means, rotation of said operating means in one direction acting to first withdraw said follower means from engagement with said cam means and to subsequently rotate said cam means to a set position and set said timer device, and rotation of said operating means in the opposite direction acting to first restore said follower means to cam engaging position and to thereafter effect movement of said follower means on said actuating lever so as to pivot said lever to an operative position and thereby move said element to said first position, said actuating lever then being retained in said operative position through the engagement of said follower means with said cam means, said timer device being operative to rotate said cam means to a release position so as to release said follower means to permit pivotal movement of said actuating lever to inoperative position so as to effect movement of said element to the second of said positions; and a spring for pivoting said lever to inoperative position.

2. A time-controlled mechanism for moving an element to two positions and for controlling the duration of stay of the element at the first of said positions, comprising: rotatable cam means; rotatable operating means; manually operable means for rotating said operating means in opposite directions; means rotatable with said operating means for rotating said cam means in one direction to a set position; a timer device for rotating said cam means in the opposite direction to a release position; an actuating lever pivoted to move toward and away from said cam means and operatively connected to said element for moving the same to said two positions; cam follower means pivoted on said actuating lever and operatively connected to said manually rotatable operating means and engageable with said cam means, rotation of said operating means in one direction acting to first pivot said follower means from engagement with said cam means and to subsequently rotate said cam means to a set position and set said timer device, and rotation of said operating means in the opposite direction acting to first restore said follower means to cam engaging position and to thereafter effect pivotal movement of said follower means on said actuating lever so as to pivot said lever to an operative position and thereby move said element to said first position, said actuating lever then being retained in said operative position through the engagement of said follower means with said cam means, said timer device being operative to rotate said cam means to a release position so as to release said follower means to permit pivotal movement of said actuating lever to inoperative position so as to effect movement of said element to the second of said positions; and a spring for pivoting said lever to inoperative position.

3. A time-controlled mechanism for moving an element to two positions and for controlling the duration of stay of the element at the first of said positions, comprising: rotatable cam means; rotatable operating means; manually operable means for rotating said operating means in opposite directions; means rotatable with said operating means for rotating said cam means in one direction to a set position; a timer device for rotating said cam means in the opposite direction to a release position; an actuating lever pivoted to move toward and away from said cam means and operatively connected to said element for moving the same to said two positions; bell-crank means pivoted on said actuating lever and operatively connected to said manually rotatable operating means and engageable with said cam means, rotation of said operating means in one direction acting to first pivot said follower means from engagement with said cam means and to subsequently rotate said cam means to a set position and set said timer device, and rotation of said operating means in the opposite direction acting to first restore said follower means to cam engaging position and to thereafter effect pivotal movement of said follower means on said actuating lever so as to pivot said lever to an operative position and thereby move said element to said first position, said actuating lever then being retained in said operative position through the engagement of said follower means with said cam means, said timer device being operative to rotate said cam means to a release position so as to release said follower means to permit pivotal movement of said actuating lever to inoperative position so as to effect movement of said element to the second of said positions; and a spring for pivoting said lever to inoperative position.

4. A time-controlled mechanism for moving a shutter of a telescope to open and closed positions and for controlling the duration of opening of said shutter, comprising: rotatable cam means; rotatable operating means; manually controlled means for rotating said operating means in opposite directions; means rotatable with said operating means for rotating said cam means in one direction to a set position; a timer device for rotating said cam means in the opposite direction to a release position; an actuating lever pivoted to move toward and away from said cam means and operatively connected to said shutter for moving the same to open and closed positions; a bell-crank lever pivoted on said actuating lever and provided with a follower at one end engageable with said cam means; a link connected between said operating means and the other end of said bell-crank lever, rotation of said operating means in one direction acting to first pivot said bell-crank lever in a direction to withdraw said cam follower from engagement with said cam means and to subsequently rotate said cam means to a predetermined set position and to set said timer device, and rotation of said operating means in the opposite direction acting to pivot said bell-crank lever in a direction to restore said follower to cam engaging position, continued pivotal movement of said bell-crank lever in this direction acting to pivot said actuating lever to an operative position and thereby move said shutter to open position, said actuating lever then being retained in said operative position by reason of the engagement of said follower with said cam means, said timer device being operative to rotate said cam means to a release position during a predetermined period of time so as to release said follower to permit pivotal movement of said actuating lever to inoperative position so as to effect movement of said shutter to closed position; and a spring connected to said actuating lever for pivoting the same to said inoperative position.

5. A time-controlled mechanism as defined in claim 4, in which said operating means comprises: a manually rotatable shaft; a disc rotatable on said shaft and provided with a pin projecting parallel with said shaft; a pin carried by said shaft and projecting radially therefrom; a first spring normally operative to rotate said shaft in said opposite direction but yieldable to permit rotation of said shaft to cam-setting position; stop means for limiting rotation of said shaft in either direction; a second spring connected to said disc and normally operative to maintain said pin of said disc in engagement with said pin of said shaft so that rotation of said shaft to cam-setting position effects rotation of said disc in the same direction, said second spring being stronger than said first spring; and stop means for limiting the rotation of said disc in said last-named direction to a portion of the rotation of said shaft, said link being connected between said disc and said bell-crank lever.

6. A time-controlled mechanism as defined in claim 4, in which said cam means includes a rotatable timing shaft and a cam fast on said shaft, in which said shaft has an adjustable arm, and in which said means rotatable with said operating means comprises an operating cam engageable with said arm for rotating said timing shaft to set position.

7. A time-controlled mechanism as defined in claim 6, and including means for rotating said timing shaft from set position to release position in response to actuation of said timer device.

8. A time-controlled mechanism as defined in claim 4, in which said operating means includes a rotatable operating shaft; a second rotatable shaft operatively connected to said operating shaft; and coin-controlled means normally operative to prevent rotation of said second shaft but operative upon the insertion of a proper coin therein to permit such rotation.

9. A time-controlled mechanism as defined in claim 8 and including: a knob rotatable on said second shaft; and friction means between said second shaft and said knob.

10. In a telescope having a shutter pivoted therein and adapted to pivot to a closed position in which it extends across the telescope to prevent observation therethrough and to an open position to allow such observation, a time-controlled mechanism for pivoting said shutter to open and closed positions, comprising: rotatable cam means; rotatable operating means; manually controlled means for rotating said operating means in opposite directions; means rotatable with said operating means for rotating said cam means in one direction to a set position; a timer device for rotating said cam means in the opposite direction to a release position; an actuating lever pivoted to move toward and away from said cam means and operatively connected to said shutter for pivoting the same to open and closed positions; a bell-crank lever pivoted on said actuating lever and provided with a follower at one end engageable with said cam means; a link connected between said operating means and the other end of said bell-crank lever, rotation of said operating means in one direction acting to first pivot said bell-crank lever in a direction to withdraw said cam follower from engagement with said cam means and to subsequently rotate said cam means to a predetermined set position and to set said timer device, and rotation of said operating means in the opposite direction acting to pivot said bell-crank lever in a direction to restore said follower to cam engaging position, continued pivotal movement of said bell-crank lever in this direction acting to pivot said actuating lever to an operative position and thereby pivot said shutter to open position, said actuating lever then being retained in said operative position by reason of the engagement of said follower with said cam means, said timer device being operative to rotate said cam means to a release position during a predetermined period of time so as to release said follower to permit pivotal movement of said actuating lever to inoperative position so as to effect pivotal movement of said shutter to closed position; and a spring connected to said actuating lever for pivoting the same to said inoperative position.

11. A time-controlled mechanism for controlling the duration of operation of a device having an element movable to open and closed positions, comprising: a first shaft having a cam thereon, said shaft being rotatable in one direction to a set position and in the opposite direction to a release position; a timer device connected to said first shaft for rotating the same to said release position; a second shaft rotatable in forward and reverse directions; manually operable means for rotating said second shaft; means on said second shaft operative to effect rotation of said first shaft to said set position upon rotation of said second shaft in said forward direction so as to set said timer device; stop means for limiting the rotation of said second shaft in either direction; an actuating lever operatively connected to said movable element; cam follower means movable on said actuating lever and engageable with said cam; operating means carried by said second shaft; an operating link connected between said operating means and said cam follower means, the first part of the rotation of said second shaft in said forward direction causing withdrawal of said follower means from said cam and continued forward rotation thereof effecting rotation of said first shaft and said cam to set position, reverse rotation of said second shaft effecting relative movement of said follower means and said actuating lever such that said follower means engages said cam and said actuating lever is pivoted in a direction to move said element to open position; and spring means operative to pivot said actuating lever in the opposite direction so as to move said element to closed position upon release of said follower means by said cam when said cam has been rotated through a predetermined distance to said release position by said timer device.

ERNEST A. MILLER.

REFERENCES CITED

The following references are of record in the file of this patent:

UNITED STATES PATENTS

| Number | Name | Date |
| --- | --- | --- |
| 709,837 | Wheeler | Sept. 23, 1902 |
| 1,063,948 | Bates | June 10, 1913 |
| 1,093,511 | Wheeler | Apr. 14, 1914 |
| 2,439,330 | Zander | Apr. 6, 1948 |